US012786178B2

(12) United States Patent
James et al.

(10) Patent No.: US 12,786,178 B2
(45) Date of Patent: Nov. 3, 2026

(54) DYNAMIC CONFIGURATION OF INTERFACES FOR VLAN INFORMATION PROPAGATION

(71) Applicant: Arista Networks, Inc., Santa Clara, CA (US)

(72) Inventors: Justin James, Bengaluru (IN); Siddarth Karki, Bengaluru (IN); Kaustav Majumdar, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/890,647

(22) Filed: Sep. 19, 2024

(65) Prior Publication Data

US 2026/0081902 A1 Mar. 19, 2026

(51) Int. Cl.
*H04L 9/40* (2022.01)
*H04L 12/46* (2006.01)

(52) U.S. Cl.
CPC .......... *H04L 63/08* (2013.01); *H04L 12/4675* (2013.01)

(58) Field of Classification Search
CPC ............................ H04L 63/08; H04L 12/4675
USPC .............................................................. 726/6
See application file for complete search history.

(56) References Cited

U.S. PATENT DOCUMENTS

| | | | | |
|---|---|---|---|---|
| 8,363,658 B1 * | 1/2013 | Delker | H04W 12/06 370/252 |
| 8,432,789 B2 * | 4/2013 | Zhang | H04L 12/1877 370/216 |
| 8,522,318 B2 * | 8/2013 | Vank | H04L 63/20 713/153 |
| 9,405,568 B2 * | 8/2016 | Garg | H04L 41/122 |
| 2004/0255154 A1 | 12/2004 | Kwan et al. | |
| 2008/0056238 A1 | 3/2008 | Inujima et al. | |
| 2024/0298176 A1 * | 9/2024 | Divvi | H04W 12/69 |

* cited by examiner

*Primary Examiner* — Amare F Tabor
(74) *Attorney, Agent, or Firm* — Treyz Law Group, P.C.; Tianyi He

(57) ABSTRACT

A network device may have an interface configured as a trunk interface. The network device may receive information indicative of the state of the interface for enabling or disabling VLAN information propagation using the interface. Based on the received information, the network device may appropriately configure the interface to participate in a VLAN information propagation protocol.

20 Claims, 10 Drawing Sheets

DYNAMIC CONFIGURATION OF INTERFACES FOR VLAN INFORMATION PROPAGATION

BACKGROUND

A communication system can include multiple network devices that are interconnected to form a network for conveying network traffic between hosts. Some network devices can be configured to handle traffic from hosts belonging to different Virtual Local Area Networks (VLANs).

DETAILED DESCRIPTION

A network can include network devices for conveying network traffic, e.g., in the form of frames, packets, etc., between hosts or generally between devices in the network. At least some network devices can be configured to propagate Virtual Local Area Network (VLAN) information (e.g., perform VLAN declaration and/or registration) with each other using messages (e.g., protocol data units) conveyed using participating network device interfaces (e.g., that are enabled for VLAN information propagation).

Configurations in which Multiple VLAN Registration Protocol (MVRP) is used to facilitate this type of VLAN information propagation are sometimes described herein as an example. If desired, VLAN information propagation may be performed based on variants of MVRP (e.g., MVRP with additional non-standardized enhancements), Generic Attribute Registration Protocol-based VLAN Registration Protocol (GVRP), variants of GVRP, or another protocol, standardized or proprietary. These protocols may each generally be referred to herein as a VLAN information propagation protocol. Any suitable VLAN information propagation protocol may be used in connection with the embodiments described herein.

While a VLAN information propagation protocol can be used to dynamically declare and register VLANs between network devices having participating network device interfaces, network device interfaces still have to be configured to participate in the VLAN information propagation protocol to enable the interfaces to receive, transmit, and/or process protocol data units in accordance with the VLAN information propagation protocol. This can often require manual configuration of network device interfaces, which can be tedious and error prone, especially given the dynamic nature of certain network deployments, the number of network devices, etc.

Accordingly, in illustrative embodiments described herein, network devices may dynamically configure (e.g., enable or disable) network device interfaces to participate in a VLAN information propagation protocol. Doing so may simplify the process of network device configuration (e.g., by removing the need to manually configure network device interfaces), thereby facilitating more efficient VLAN information propagation (e.g., by setting up network devices to perform VLAN information propagation more quickly), among other advantages.

Figure 1:
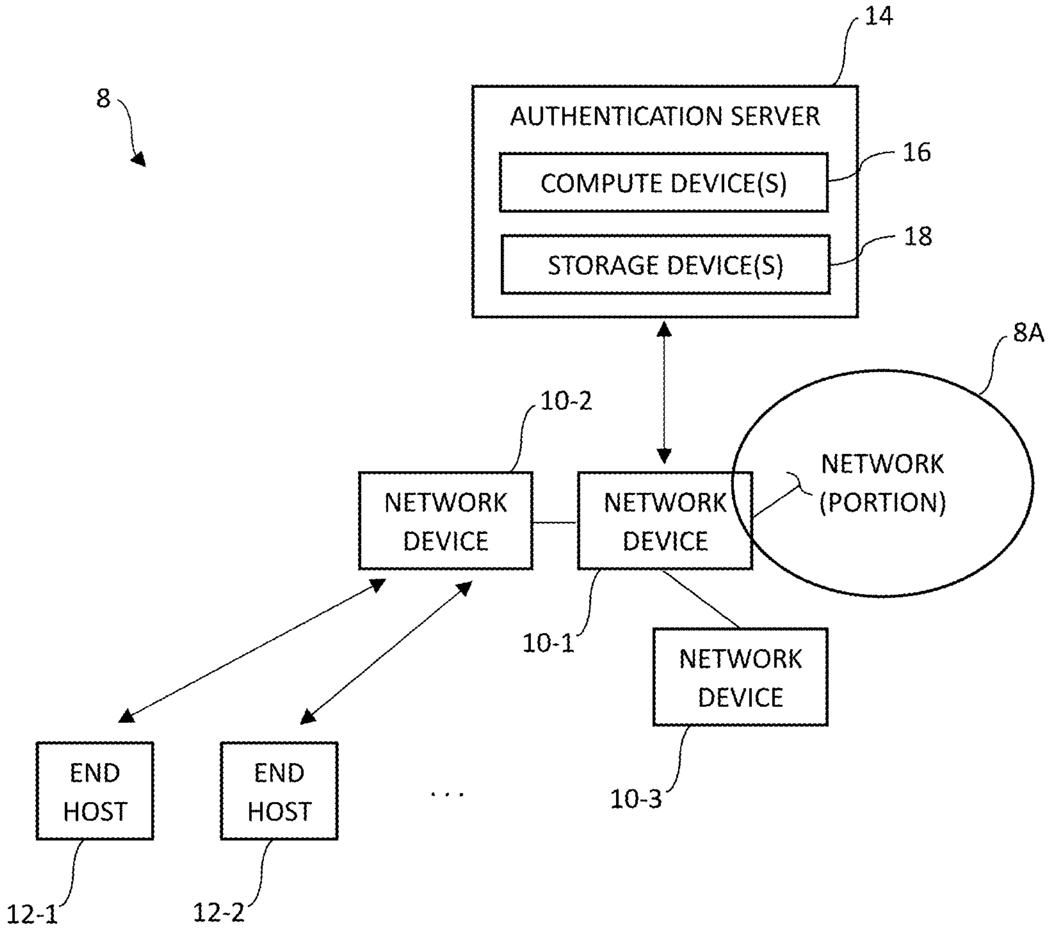
FIG. 1 is a diagram of an illustrative networking system having multiple network devices coupled to each other in accordance with some embodiments.

An illustrative networking system in which network device(s) are configured to dynamically configure network device interfaces to participate in a VLAN information propagation protocol is shown in FIG. 1. In the example of FIG. 1, the networking system may include one or more components of a network such as network 8. Network 8 may have any suitable scope. As examples, network 8 may include, be, and/or form part of one or more local segments, one or more local subnets, one or more local area networks (LANs), one or more virtual local area networks (VLANs), one or more campus area networks, a wide area network, etc. Network 8 may include a wired network (portion) based on wired technologies or standards such as Ethernet (e.g., using copper cables and/or fiber optic cables) and a wireless network (portion) such as one or more wireless local area networks (WLANs) (e.g., wireless networks compliant with the IEEE 802.11 standard(s)). If desired, network 8 may include internet service provider networks (e.g., the Internet) or other public service provider networks, private service provider networks (e.g., multiprotocol label switching (MPLS) networks), and/or other types of networks such as telecommunication service provider networks.

Network 8 may be implemented using network devices 10 that handle (e.g., process by modifying, forwarding, routing, etc.) network traffic to convey information for user applications between end hosts 12 and/or generally for other applications between devices. Network 8 can include networking equipment forming a variety of network devices 10 that interconnect end hosts 12 of network 8. Each instance of network device 10 in network 8 (e.g., network device 10-1, network device 10-2, network device 10-3, etc.) may be a wireless access point, a network switch (e.g., a multilayer (Layer 2 and Layer 3) switch, a single-layer (Layer 2) switch, etc.), a bridge, a router, a gateway, a hub, a repeater, a firewall, a device serving other networking functions, management equipment that manages and controls the operation of network device(s), or a device that include the functionality of two or more of these devices.

Each instance of end host 12 in network 8 (e.g., end host 12-1, end host 12-2, etc.) can include a computer, a server, a portable electronic device such as a cellular telephone or laptop, another type of specialized or general-purpose host computing equipment (e.g., running one or more client-side and/or server-side applications), a network-connected appliance or device such as a camera, a thermostat, a wireless sensor, a medical or health sensor, another type of sensor, a lighting fixture, a speaker, a printer, a controller, or other network-connected equipment that serves as an input-output device or computing device in a distributed networking system, a device used by network administrators (sometimes referred to as an administrator device), a network service or analysis device, or management equipment that manages and controls the operation of one or more of other end hosts and/or network devices.

In the example of FIG. 1, network 8 includes three illustrative network devices 10-1, 10-2, and 10-3. In some illustrative network configurations sometimes described herein as an example, network device 10-2 may be a wireless access point communicatively coupled to end hosts 12 such as end hosts 12-1 and 12-2 via respective wireless links, and/or network device 10-1 may be a network switch (e.g., a Power over Ethernet (PoE) switch) communicatively coupled to network device 10-2. This example is merely illustrative. If desired, network device 10-2 may be a network device (e.g., a network switch) communicatively coupled to end hosts 12-1 and 12-2 via respective wired links. When network device 10-2 is implemented as a wireless access point, network device 10-2 may provide a wireless network through which end hosts 12 are communicatively coupled to network device 10-1 and a remaining portion of network 8 (e.g., network portion 8A).

To ensure that some network devices and/or hosts are authorized to connect to network 8, one or more authentication systems (e.g., implemented as an end host of network 8) may be communicatively coupled to network 8 (e.g., some network devices 10 therein). In some illustrative configurations described herein as an example, an authentication system may be implemented on server equipment, e.g., as a client authentication and/or network device authentication server 14. The server equipment on which authentication server 14 is implemented may include server hardware such as one or more blade servers, one or more rack servers, and/or one or more tower servers. Compute device(s) 16 and storage device(s) 18 for implementing the functions of authentication server 14 may be provided as part of the server hardware.

Compute device(s) 16 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors. Compute device(s) 16 for implementing the functions of authentication server 14 may sometimes be referred to as the processing circuitry of authentication server 14.

Storage device(s) 18 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to server equipment), and/or other types of memory circuitry. Storage device(s) 18 for implementing the functions of authentication server 14 may sometimes be referred to as the memory circuitry of authentication server 14.

In general, storage device(s) 18 may include one or more non-transitory (tangible) computer-readable storage media that store the operating system software and/or any other software code, sometimes referred to as program instructions, software, data, instructions, or code. Compute device(s) 16 may run (e.g., execute) an operating system and/or other software and firmware stored on the one or more non-transitory computer-readable storage media to perform the operations of authentication server 14 described herein. In other illustrative arrangements, an authentication system for network 8 (e.g., coupled to network device(s) 10) may be implemented on one or more dedicated local authentication devices or generally implemented using non-server hardware, in place of or in addition to providing an authentication server 14.

Authentication server 14 may provide, based on its processing circuitry executing instructions stored on its memory circuitry, one or more authentication services for authorizing network access by different entities (e.g., a user identity authentication service, a client device authentication service, a network device or wireless access point authentication service, etc.). When authorizing network access, authentication server 14 may exchange messages with network devices 10 in network 8 (that serve as authenticators) such as network device 10-1 (e.g., to authenticate network device 10-2 and network device 10-3 for network access) and network device 10-2 (e.g., to authenticate end hosts 12-1 and 12-2 for network access). These messages may be exchanged via any suitable communication path. As an example, these communication paths (e.g., communication path(s) between network device 10-1 and server 14, communication path(s) between network device 10-2 and server 14, etc.) may include (wired) network paths through a wired network (e.g., through network portion 8A and the network devices therein, using the Internet, etc.). If desired, a network device 10 (e.g., device 10-1) may be directly connected to server 14 without other intervening network devices.

If desired, authentication server 14 may be or form part of an Authentication, Authorization, and Accounting (AAA) server or a network access control server. In some illustrative configurations described herein as an example, authentication server 14 may be a Remote Authentication Dial-In User Service (RADIUS) server that uses the RADIUS protocol to perform AAA operations (e.g., by communicating with network devices 10 such as network device 10-1).

Figure 2:
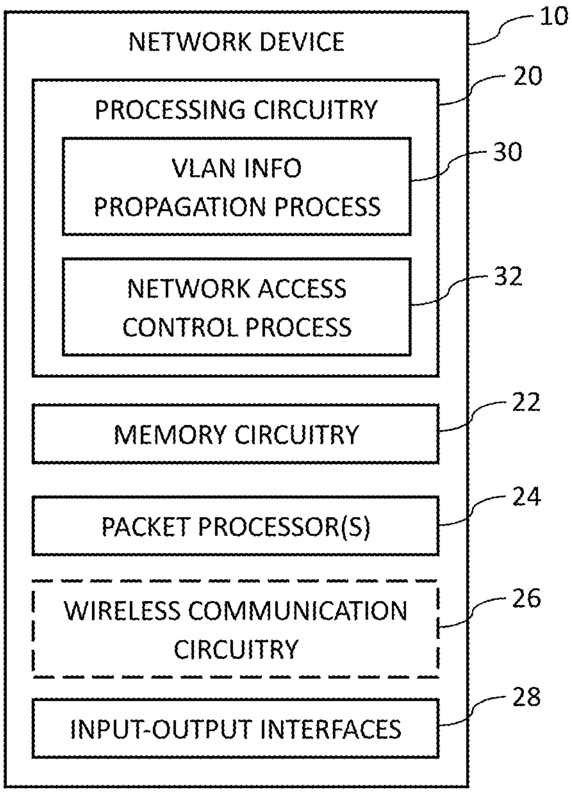
FIG. 2 is a diagram of an illustrative network device in accordance with some embodiments.

FIG. 2 is a diagram of an illustrative network device (e.g., differences instances of which, or variations thereof, can be used to implement different network devices 10 in network 8 of FIG. 1, such as network devices 10-1, 10-2, and 10-3). As shown in FIG. 2, a network device 10 may include processing circuitry 20, memory circuitry 22, packet processor(s) 24, wireless communication circuitry 26, and/or other components such as input-output interfaces 28. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

The network device configuration shown in FIG. 2 is merely illustrative. Different (types of) network devices in network 8 of FIG. 1 may have different configurations and may include at least some of the components shown in FIG. 2 (while optionally omitting other components shown in FIG. 2). As an example, an illustrative wireless access point (e.g., when implementing device 10-2 in FIG. 1) may include wireless communication circuitry 26 and/or may lack (dedicated or specialized) packet processor(s) 24. As another example, an illustrative network switch (e.g., when implementing device 10-1 in FIG. 1) may include packet processor(s) 24 and/or may lack wireless communication circuitry 26. In illustrative configurations described herein, some network device components such as processing circuitry 20, memory circuitry 22, and input-output interfaces 28 may be common across different types of network devices, although their implementation and configuration across network devices 10 may still differ.

Processing circuitry 20 of network device 10 may include one or more processors such as central processing units (CPUs), graphics processing units (GPUs), microprocessors, general-purpose processors, host processors, microcontrollers, digital signal processors, programmable logic devices (e.g., field programmable gate array (FPGA) devices), application specific system processors (ASSPs), application specific integrated circuit (ASIC) processors, and/or other types of processors.

Processing circuitry 20 may run (e.g., execute) a network device operating system and/or other software/firmware that is stored on memory circuitry 22. Memory circuitry 22 may include one or more non-transitory (tangible) computer-readable storage media that store the operating system software and/or any other software code, sometimes referred to as program instructions, software, data, instructions, or code. In particular, memory circuitry 22 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to network device 10), and/or other types of memory circuitry.

Processing circuitry 20 and memory circuitry 22 (or at least parts of both) may sometimes be referred to collectively as control circuitry that implements a control plane for network device 10. As just a few examples, processing circuitry 20 may execute network device control plane software such as operating system software, routing policy management software, routing protocol agents or processes, routing information base agents, and other control software, may be used to support the operation of protocol clients and/or servers (e.g., to form some or all of a communications protocol stack), may be used to support the operation of packet processor(s) 24, may store packet forwarding information, may execute packet processing software, and/or may execute other software instructions that control the functions of network device 10 and the other components therein.

Packet processor(s) 24 may be used to implement a data plane or forwarding plane of network device 10. Packet processor(s) 24 may include one or more processors such as programmable logic devices (e.g., field programmable gate array (FPGA) devices), application specific system processors (ASSPs), application specific integrated circuit (ASIC) processors, central processing units (CPUs), graphics processing units (GPUs), microprocessors, general-purpose processors, host processors, microcontrollers, digital signal processors, and/or other types of processors.

A packet processor 24 may receive incoming (ingress) network traffic via input-output interfaces 28, parse and analyze the received network traffic, process the network traffic based on packet forwarding decision data (e.g., in a forwarding information base) and/or in accordance with network protocol(s) or other forwarding policy, and forward (or drop) the network traffic accordingly (e.g., egress the processed network traffic via input-output interfaces 28). The packet forwarding decision data may be stored on memory circuitry integrated as part of and/or separate from packet processor 24 (e.g., on content-addressable memory), and/or on a portion of memory circuitry 22. Memory circuitry for packet processor 24 may include volatile memory, non-volatile memory, and/or other types of memory circuitry.

In some illustrative configurations (e.g., when network device 10 of FIG. 2 is used to implement a wireless access point serving as device 10-2 in FIG. 1), network device 10 may include wireless communication circuitry 26 configured to communicate wirelessly with client devices (e.g., end hosts 12-1 and 12-2 in FIG. 1) and generally provide wireless communication capabilities. Wireless communication circuitry 26 may include one or more radios (e.g., Wi-Fi and/or Bluetooth radios), radio-frequency transceiver circuitry, radio-frequency front-end circuitry, and one or more antennas. The one or more radios may use the one or more antennas to transmit radio-frequency signals to and receive radio-frequency signals from one or more end hosts 12. While wireless communication circuitry 26 is shown as a separate element from processing circuitry 20, this is merely illustrative. If desired, portions of wireless communication circuitry 26 (e.g., radio functionalities) may be implemented as a portion of processing circuitry 20.

Input-output interfaces 28 of network device 10 may include one or more different types of communication interfaces such as Ethernet interfaces, optical interfaces, and/or other types of communication interfaces for connecting network device 10 to the Internet, a local area network, a wide area network, and/or generally other network device(s) 10 (e.g., network devices 10-2 and 10-3 in FIG. 1) and computing equipment (e.g., host equipment such as server equipment for server 14, end hosts 12, etc.).

In illustrative configurations described herein as an example, at least some of input-output interfaces 28 are Ethernet interfaces implemented using and therefore include (Ethernet) ports. In particular, physical layer and/or data link layer interface circuitry in network device 10 may be coupled to the ports and use the ports to form Ethernet interfaces with the desired interface configurations. The ports may be physically coupled and electrically connected to corresponding mating connectors of external equipment, when received at the ports, and may have different form-factors to accommodate different cables, different modules, different devices, or generally different external equipment. If desired, some of input-output interfaces 28 may include wireless interfaces (e.g., Wi-Fi interfaces, Bluetooth interfaces, etc.) formed using wireless communication circuitry 26 for wirelessly connecting to external equipment (e.g., end hosts 12-1 and 12-2 in FIG. 1 or other end hosts, other network devices, etc.).

If desired, network device 10 may include other components such as power supply components, power management components, interconnect structures such as a system bus that communicatively couple the internal components of device 10 to one another, to power supply and/or management components, to the control circuitry, etc. The control circuitry (e.g., processing circuitry 20 and/or memory circuitry 22) of device 10 may be communicatively coupled to other components of device 10 via one or more paths (in the system bus or elsewhere) that enable the reception and transmission of control signals, data, and/or other information therebetween.

In some illustrative device configurations (e.g., when network device 10 of FIG. 2 is used to implement device 10-1 in FIG. 1 that dynamically configures its interface(s) 28 to participate in a VLAN information propagation protocol, when network device 10 of FIG. 2 is used to implement network device 10-2 in FIG. 1 that provides connected-host VLAN information to device 10-1 for propagation, when network device 10 of FIG. 2 is used to implement network device 10-3 in FIG. 1 that receives the propagated connected-host information from device 10-1 originally from network device 10-2, etc.), processing circuitry 20 of network device 10 may execute a VLAN information propagation process 30 (sometimes referred to as a VLAN information propagation agent 30) that operates and facilitates operations in accordance with a VLAN information propagation protocol.

As examples, processing circuitry 20, when executing process 30, may configure and manage the VLAN information propagation state of interfaces 28 (e.g., indicative of which of interfaces 28 participate in the use of the VLAN information propagation protocol), may obtain protocol data units in accordance with the VLAN information propagation protocol from participating interfaces 28, may process the protocol data units received at participating interfaces 28 (e.g., to register one or more identifiers of VLANs identified therein at appropriate participating interface(s), to remove one or more one or more identifiers of VLANs identified therein from appropriate participating interface(s) 28, to propagate one or more identifiers of VLANs identified therein to other network devices and their appropriate participating interfaces, etc.), and/or may generate and transmit protocol data units in accordance with the VLAN information propagation protocol for VLAN declaration and/or generally VLAN information propagation to other network devices.

Additionally, in some illustrative device configurations (e.g., when network device 10 of FIG. 2 is used to implement device 10-1 in FIG. 1 that serves as an authenticator device for device 10-2 and/or device 10-3 in FIG. 1, when network device 10 of FIG. 2 is used to implement device 10-2 in FIG. 1 that serves as an authenticator device for hosts 12-1 and 12-2, etc.) processing circuitry 20 of network device 10 may execute a network access control process 32 (sometimes referred to as a network access control agent 32) that authenticates devices (e.g., network devices and/or end hosts) for network access in accordance with a network access control protocol. Some illustrative examples of operations performed by processing circuitry 20, when executing process 32, are provided in the example of FIG. 3 (e.g., in connection with network device 10-1).

Processing circuitry 20 may execute processes 30 and 32 by executing software instructions stored on memory circuitry 22 (e.g., one or more non-transitory computer-readable storage media). While processes 30 and 32 are sometimes described herein to perform respective parts of the operations for dynamically configuring network device interfaces to participate in a VLAN information propagation protocol, this is merely illustrative. Processing circuitry 20 may be organized and configured in any suitable manner (e.g., to execute any other processes or agents instead of or in addition to processes 30 and 32) to perform each part of these operations. Accordingly, processing circuitry 20 may sometimes be described herein to perform these operations instead of specifically referring to the one or more agents, processes, and/or kernel executed by and implemented on processing circuitry 20.

Figure 3:
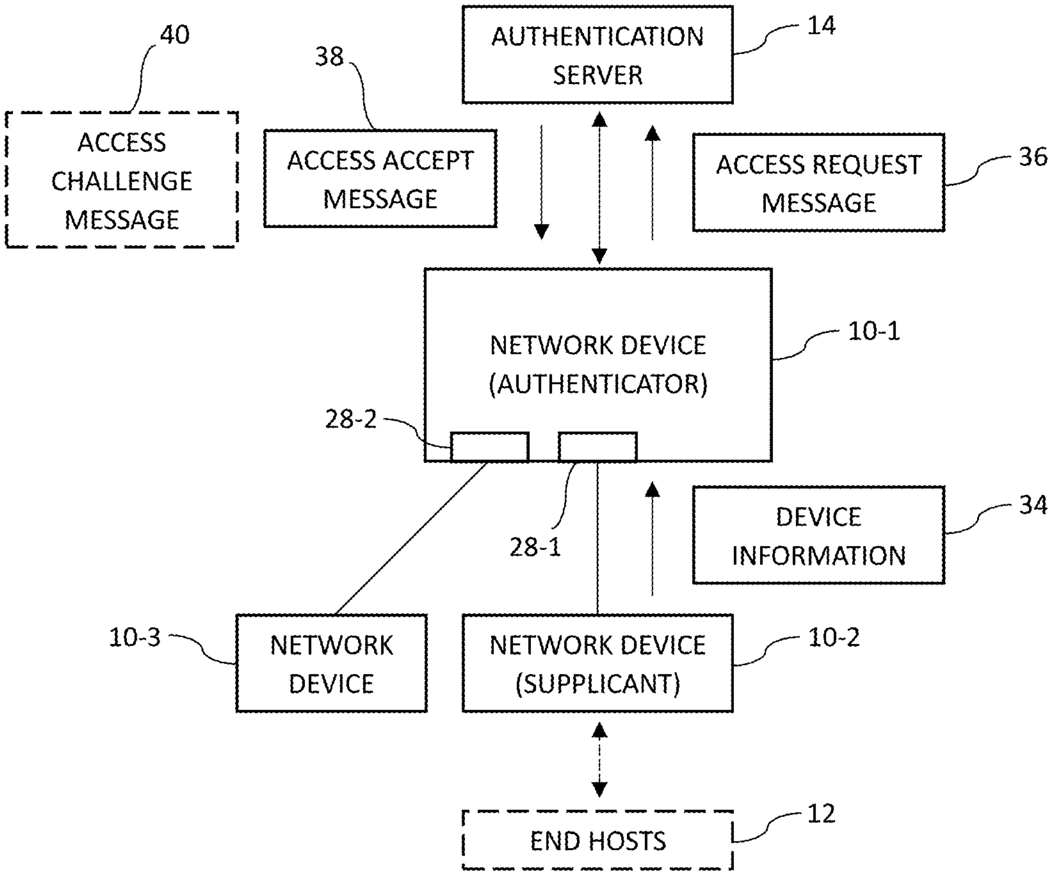
FIG. 3 is a diagram of an illustrative authenticator device configured to authenticate network access by a supplicant device using an authentication system in accordance with some embodiments.

FIG. 3 is a diagram of an illustrative authenticator device (e.g., network device 10-1 in FIG. 1) configured to authenticate network access of a supplicant device (e.g., network device 10-2 in FIG. 1) using an authentication system (e.g., authentication server 14 in FIG. 1).

Configurations in which a protocol in compliance with or otherwise compatible with IEEE 802.1X is used to perform the authentication operation described in connection with FIG. 3 are sometimes described herein as an example. The one or more protocols that are in compliance with or otherwise compatible with IEEE 802.1X, or if desired, other standardized or proprietary protocols for achieving network access control may each generally be referred to herein as a network access control protocol. Any suitable network access control protocol may be used in connection with the embodiments described herein.

In the example of FIG. 3, network device 10-1 may serve as the authenticator for authenticating network device 10-2 (e.g., a wireless access point), network device 10-2 may serve as the supplicant, and authentication server 14 (e.g., a RADIUS server) may serve as the authentication server for authenticating network access by the supplicant. Accordingly, when device 10-2 is communicatively coupled to interface 28-1 of device 10-1 (e.g., an instance of input-output interface 28 in FIG. 2 for device 10-1), device 10-2 (e.g., processing circuitry 20 thereof) may provide network device information 34 for device 10-2 such as an identifier (e.g., a hardware or Media Access Control (MAC) address) of device 10-2, a certificate, key, or other cryptographic information for validating the authenticity of device 10-2, its manufacturer, or its user, and/or other types of information that may help facilitate authentication of device 10-2 for connecting to network 8 and for establishing trust for operation as part of network 8.

Processing circuitry 20 of device 10-2 may provide (e.g., generate) a message containing information 34 (e.g., a message requesting authentication of device 10-2 or generally facilitating the authentication of network 10-2 for network access) and may transmit, using an input-output interface 28 on device 10-2, the message containing device information 34 to network device 10-1. Network device 10-1 (e.g., processing circuitry 20 thereof) may receive the message containing information 34 via interface 28-1, communicatively coupled to an input-output interface 28 of device 10-2 via a wired connection with or without intervening network device(s). Network interface 28-1 may be configured to convey traffic for (e.g., to and/or from) device 10-2.

Based on receiving the message using interface 28-1 and in response to processing the message containing information 34, processing circuitry 20 of device 10-1 may provide (e.g., generate) a network access request for device 10-2, e.g., in access request message 36. Access request message 36 may include at least some (e.g., all) of device information 34 to facilitate the authentication of device 10-2. Processing circuitry 20 of device 10-1 may transmit access request message 36 (e.g., using another input-output interface 28 of device 10-1 different from interface 28-1 coupled to device 10-2, through network paths in network 8, etc.) to authentication server 14 which provides a supplicant device authentication service (e.g., implemented by compute device(s) 16 executing instructions for implementing the service stored on storage device(s) 18).

Responsive to receiving access request message 36, authentication server 14 (e.g., the processing circuitry thereof) may process request message 36 and any device information 34 therein to determine whether or not to authenticate device 10-2 for network access. As one illustrative example, the processing circuitry of server 14 may perform one or more lookup operations and/or cryptographic operations, using device information 34 in request message 36 as the input or key, to verify (based on the output of these operations) that device 10-2 should be authenticated.

Once authentication of device 10-2 has been performed, the processing circuitry of server 14 may provide (e.g., generate) a network access response for device 10-2, e.g., in an access response message, such as access accept message 38 indicative of successful authentication of device 10-2 for network access. The processing circuitry of server 14 may transmit, on a network interface of server 14, access accept message 38 to network device 10-2 (e.g., through network paths in network 8). Upon receiving message 38, network device 10-1 may authorize or grant network access (e.g., to network portion 8A in FIG. 1) to device 10-2, thereby indicating to device 10-2 of its successful authentication. If desired, device 10-2 (e.g., processing circuitry 20 thereof) may obtain, from network device 10-1, an indication of successful authentication as a message following the reception of message 38 by network device 10-1.

In some instances, prior to providing and transmitting an access accept message 38, authentication server 14 may transmit other types of messages such as an access challenge message 40 to request further information regarding supplicant device 10-2 from device 10-1. Upon device 10-1 obtaining the additional requested information from device 10-2 and conveying the requested information to authentication server 14, authentication server 14 may generate and transmit access accept message 38 to device 10-1 based on the additional information.

Still referring to FIG. 3, after network device 10-2 has been authenticated for access to network 8, additional devices such as end hosts 12 (e.g., end hosts 12-1 and 12-2 in FIG. 1) may be communicatively coupled to device 10-2 (e.g., a wireless access point) and, through device 10-2, to other network portions of network 8. These end hosts 12 may belong to different Virtual Local Area Networks (VLANs). Accordingly, interface 28-1 of device 10-1 coupled to device 10-2 may be configured as a trunk port (sometimes referred to as a trunk interface) to facilitate traffic handling for multiple VLANs (e.g., for traffic carrying different identifiers for the VLANs).

In the example of FIG. 3, trunk interfaces such as interface 28-1 should be configured for VLANs to which connected hosts 12 belong to facilitate appropriate traffic handling for these hosts 12. While a VLAN information propagation protocol may be used to perform VLAN declaration and/or registration to enable participating trunk interfaces on different network devices (e.g., on network devices 10-1, 10-2, and 10-3) to be appropriately configured (e.g., with the VLANs), a trunk interface such as trunk interface 28-1 needs to enable participation in the VLAN information propagation protocol before the VLAN declaration and/or registrations operations (e.g., the operations of processing protocol data units to register VLANs, the operations of transmitting protocol data units that declare VLANs, and/or other operations described in connection with process 30 in FIG. 2) can take place for the trunk interface based on protocol data units received at the trunk interface. Manual configuration of these trunk interfaces to participate in or enable the VLAN information propagation protocol can be tedious and error prone, especially in scenarios in which network devices such as device 10-1 is likely to be connected and disconnected from the trunk interfaces without prior knowledge.

In order to avoid a network administrator having to manually configure trunk interface such as trunk interface 28-1 to participate in VLAN information propagation and generally to simplify network configuration and management, mechanisms for distributing a VLAN information propagation configuration to configure network device interfaces such as trunk interface 28-1 may be provided. In such a manner, a trunk interface such as interface 28-1 may be configured dynamically (e.g., automatically without administrator intervention) to participate in VLAN information propagation based on the presence and successful authentication of device 10-2.

After interface 28-1 is configured to participate in VLAN information propagation, a protocol data unit (in accordance with the VLAN information propagation protocol) containing (host) VLAN information (e.g., one or more identifiers of VLANs to which hosts 12 belong, one or more identifiers of no-longer-used VLANs, etc.) may be conveyed from device 10-2 to interface 28-1 of device 10-1. Processing circuitry 20 of device 10-1 may receive and process the protocol data unit (e.g., to add one or more of these VLAN identifiers to one or more local interfaces 28, to delete one or more of these VLAN identifiers from one or more local interfaces 28, to otherwise modify VLAN configuration on one or more local interfaces 28 based on the protocol data unit, to propagation the VLAN information in the protocol data unit by transmitting protocol data units containing the VLAN information to other participating network devices that appropriately configure their local interfaces based on the VLAN information). In the example of FIG. 3, device 10-1 having participating interface 28-1 may receive protocol data units from device 10-2 at interface 28-1 and may propagate the VLAN information in the received protocol data units to network device 10-3 via local interface 28-2 by transmitting corresponding protocol data units containing the VLAN information (originating from device 10-2) to device 10-3. Based on the protocol data units from device 10-1, device 10-3 may also configure its local interfaces participating in VLAN information propagation and/or further propagate the VLAN information to other network devices.

In illustrative configurations described herein as examples, authentication server 14 may provide the VLAN information propagation configuration information (e.g., an indication on whether or not an interface should participate in VLAN information protocol) in a message, such as access accept message 38, sent to network device 10-1.

Figure 4:
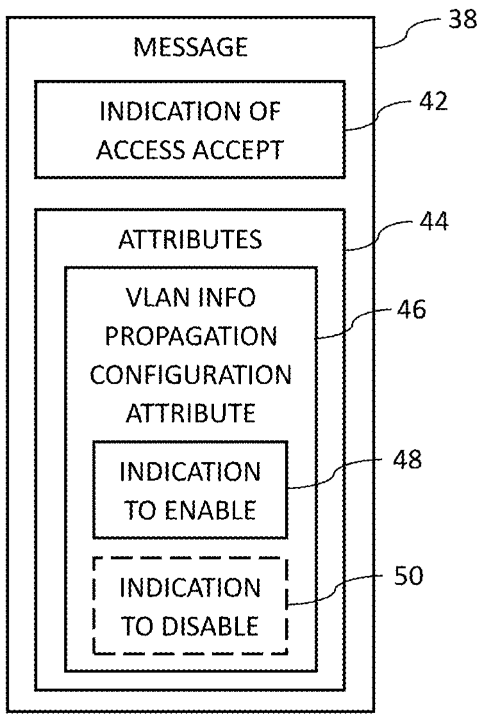
FIG. 4 is a diagram of an illustrative message containing VLAN information propagation configuration information in accordance with some embodiments.

FIG. 4 is a diagram of an illustrative message such as message 38 in FIG. 3. Message 38 may include an indication 42 of the type of message 38 being an access accept message. Message 38 may include multiple attributes 44 including a set of standardized and extended attributes (e.g., in compliance with the RADIUS protocol), and vendor-specific attributes. In illustrative configurations described herein as an example, attributes 44 (e.g., a given vendor-specific attribute, or if desired a standardized or extended attribute or another type attribute in the message format) may include a VLAN information propagation configuration attribute 46 (e.g. used to indicate the participation or non-participation of the supplicant device, and consequently the trunk interface coupled to the supplicant device, in VLAN information propagation).

In particular, attribute 46 may include an indication 48 to enable VLAN information propagation for the supplicant device (e.g., to configure the trunk interface communicatively coupled to the supplicant device to exhibit a VLAN information propagation enabled state) or an indication 50 to disable VLAN information propagation for the supplicant device (e.g., to configure the trunk interface communicatively coupled to the supplicant device to exhibit a VLAN information propagation disabled state). In illustrative configurations described herein as an example, attribute 46 containing a first value (e.g., '1') provides the indication 48 to enable and attribute 46 having a second value (e.g., '0') provides the indication 50 to disable. If desired, other manners of conveying VLAN information propagation configuration information may be used.

The illustrative format of message 38 shown in FIG. 4 is merely illustrative. In some instances, messages 38 sent to authenticator device 10-1 for authenticating some supplicant devices may lack attribute 46. If desired, message 38, with or with attribute 46, may include other attributes and other information.

While in connection with some examples described herein the indication of VLAN information propagation configuration is provided in access accept messages, this is merely illustrative. If desired, other messages from server 14 to network device 10-1 may include VLAN information propagation configuration (e.g., attribute 46) instead of or in addition to an access accept message. In other words, indication 42 of access accept and attribute 46 may be provided in separate (e.g., sequential) messages from server 14 to network device 10-1 and/or in other manners, as desired.

To populate messages (e.g., message 38) with appropriate VLAN information propagation settings (configurations) for supplicant devices, authentication server 14 may maintain (e.g., store on memory circuitry thereof) corresponding VLAN information propagation configuration information for different supplicant devices or different types of supplicant devices (e.g., in corresponding supplicant device profiles, by associating a first type of supplicant devices that can handle multi-VLAN traffic with an setting that enables VLAN information propagation, by associating a second type of supplicant devices that does not handle multi-VLAN traffic with an setting that disables VLAN information propagation, by considering other criteria or heuristics, etc.) Based on maintained information, authentication server 14 (e.g., processing circuitry thereof) may identify (e.g., perform a lookup of) the corresponding VLAN information propagation setting for a given supplicant device to populate the message (e.g., the access accept message) transmitted to the authenticator device for the supplicant device.

Figure 5:
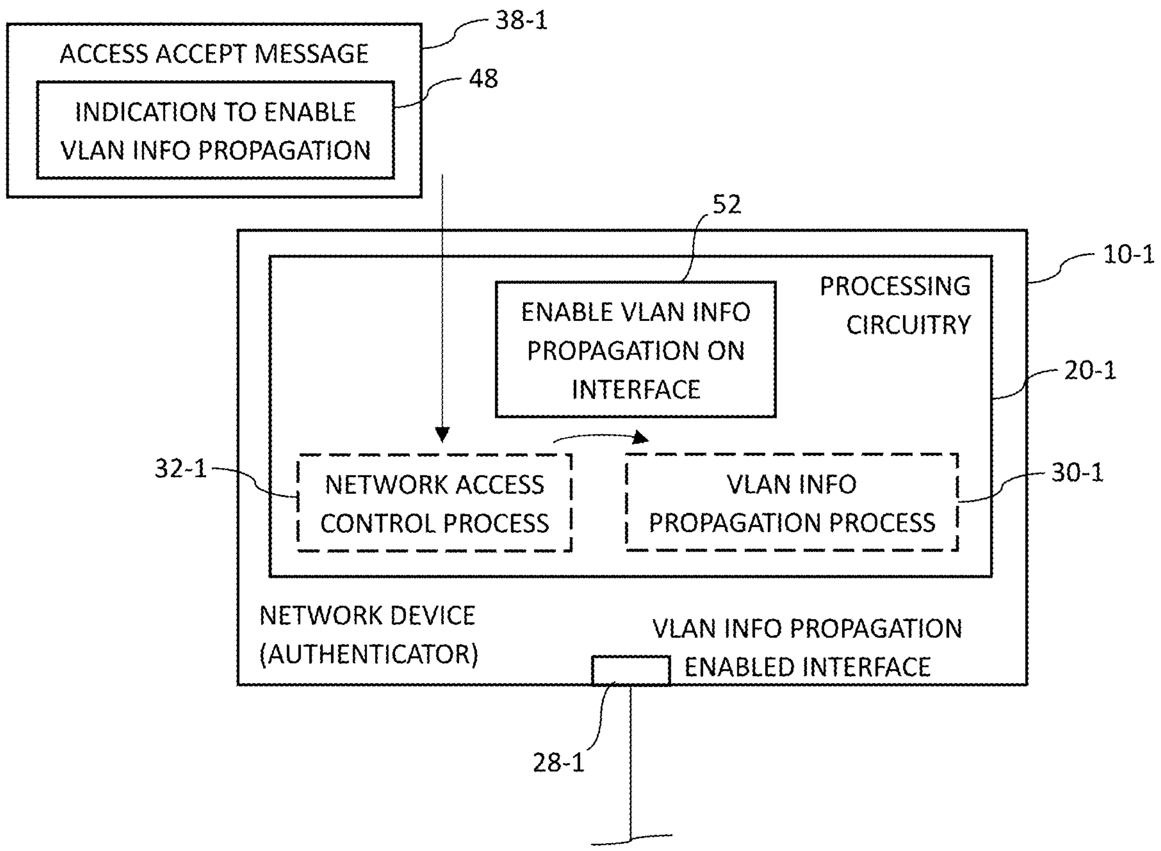
FIG. 5 is a diagram of an illustrative network device configured to enable VLAN information propagation at an interface based on a corresponding indication in accordance with some embodiments.

FIG. 5 is a diagram of illustrative network device processing circuitry 20-1 of network device 10-1 (e.g., an instance of processing circuitry 20 in FIG. 2 when implemented for device 10-1). Processing circuitry 20-1 may be configured to enable VLAN information propagation at an interface (e.g., interface 28-1) based on a message from external equipment such as access accept message 38-1 (e.g., an instance of message 38 in FIG. 4) from an authentication system.

In particular, network access control process 32-1 (e.g., an instance of process 32 in FIG. 2) executing on processing circuitry 20-1 may handle processing of access accept message 38-1 and more generally operations in connection with authorizing a supplicant device such as device 10-2 for network access. Based on indication 48 to enable VLAN information propagation for device 10-2 in access accept message 38-1, processing circuitry 20-1 (e.g., when executing process 32-1) may identify (trunk) interface 28-1 connected to supplicant device 10-2 (FIG. 3), among a plurality of local interfaces on device 10-1, and convey information 52 to VLAN information propagation process 30-1 (e.g., an instance of process 30 in FIG. 2) executing on processing circuitry 20-1. Information 52 may indicate that VLAN information propagation (e.g., operations in connection with the VLAN information propagation protocol) should be enabled on the identified interface 28-1.

As examples, information 52 may be conveyed from process 32-1 to process 30-1 by process 32-1 publishing the information to a shared location (e.g., a shared file or file path) to which process 30-1 is subscribed to receive information updates (e.g., the newly published information 52), may be conveyed from process 32-1 to process 30-1 directly as a message or instruction, and/or may be conveyed from process 32-1 to process 30-1 in other manners. Subsequently, processing circuitry 20-1 (e.g., when executing process 30-1) may enable interface 28-1 to participate in VLAN information propagation (e.g., configure interface 28-1 to exhibit a VLAN information propagation enabled state that indicates participation in a VLAN information propagation protocol).

In such a manner, trunk interface 28-1 coupled to a supplicant device 10-2 may be enabled to participate in VLAN information propagation without needing manual configuration of interface 28-1 at device 10-1, thereby simplifying device configuration for a network administrator, among other advantages.

Figure 6:
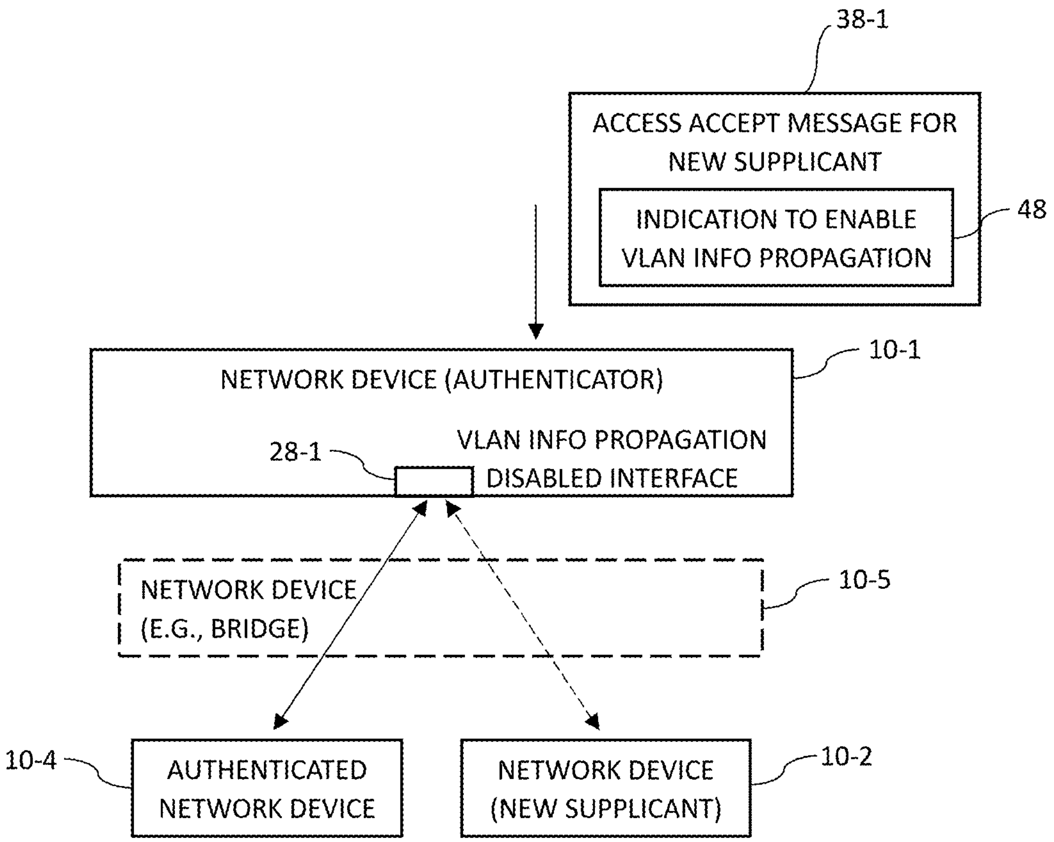
FIGS. 6 and 7 are diagrams of illustrative scenarios with an existing authenticated device coupled to an interface when a new supplicant device is being authenticated on the same interface in accordance with some embodiments.
Figure 7:
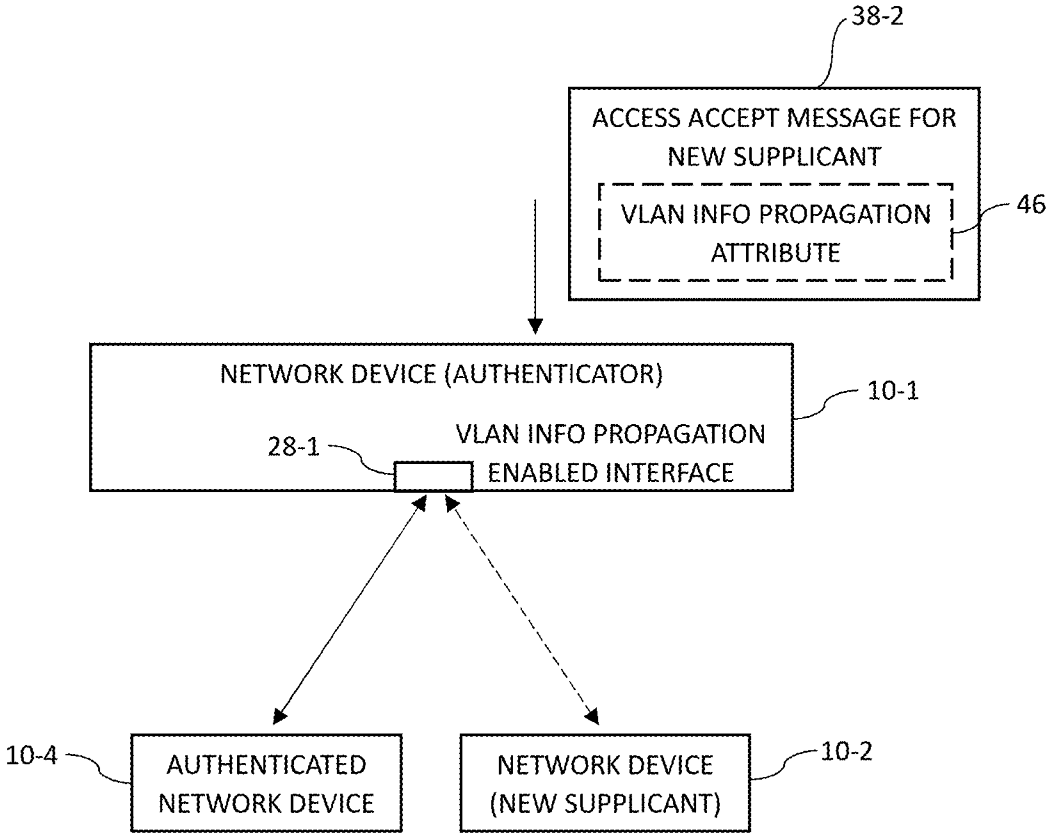

FIGS. 6 and 7 show illustrative scenarios in which an authenticator device is configured to handle a new supplicant network device (e.g., network device 10-2) is being authenticated on a (shared) trunk interface already communicatively coupled to an existing (already-previously) authenticated network device coupled to the same trunk interface.

In the example of FIG. 6, network device 10-1 may have trunk interface 28-1 that is disabled for VLAN information propagation using the VLAN information propagation protocol, e.g., resulting from the authentication process of an existing authenticated device 10-4 communicatively coupled to interface 28-1. In particular, during a network access authentication operation for device 10-4 analogous to the network access authentication operation described in connection with FIG. 3 for device 10-2, access accept message 38 for authenticating device 10-4 for network access may not have included a VLAN information propagation configuration attribute (e.g., attribute 46 in FIG. 4) or may have included, in the VLAN information propagation configuration attribute, indication 50 to disable VLAN information propagation configuration. The reception and processing of this type of access accept message by device 10-1 (e.g., processing circuitry 20-1) may have caused interface 28-1 to be disabled for VLAN information propagation.

In the illustrative example in which interface 28-1 is disabled for VLAN information propagation, this existing configuration state of interface 28-1 may affect authentication of new supplicants communicatively coupled to interface 28-1. Still referring to FIG. 6, when new supplicant device 10-2 is communicatively coupled to interface 28-1 to which device 10-4 is already communicatively coupled (e.g., both through an intervening network device 10-5 such as a bridge), the operations described in connection with FIG. 3 may still take place to authenticate device 10-2 for network access. As described in connection with FIGS. 3 and 5, device 10-1 (e.g., processing circuitry 20-1) may receive an access accept message 38-1 for authenticating device 10-2 that contains indication 48 to enable VLAN information propagation. In this scenario in which the newly indicated VLAN information propagation (enabled) state (e.g., caused by indication 48) is inconsistent with the existing VLAN information propagation (disabled) state of trunk interface 28-1, authenticator device 10-1 (e.g., processing circuitry 20-1) may not authenticate or authorize the new supplicant device 10-2 for network access through shared interface 28-1 because of the inconsistency.

In the example of FIG. 7, network device 10-1 may have trunk interface 28-1 that is enabled for VLAN information propagation using the VLAN information propagation protocol, e.g., resulting from the authentication process of an existing authenticated device 10-4 (e.g., receiving an access accept message containing an indication to enable VLAN information propagation when device 10-4 has been authenticated). In the illustrative example in which interface 28-1 is enabled for VLAN information propagation, this existing configuration state of interface 28-1 may affect authentication of new supplicants communicatively coupled to interface 28-1.

Still referring to FIG. 7, when new supplicant network device 10-2 is communicatively coupled to interface 28-1 to which device 10-4 is already communicatively coupled (e.g., both through an intervening network device such as a bridge), the operations described in connection with FIG. 3 may still take place to authenticate device 10-2 for network access. In this example of FIG. 7, device 10-1 (e.g., processing circuitry 20-1) may receive an access accept message 38-2 for authenticating device 10-2 that lacks VLAN information propagation configuration information (e.g., an instance of an access accept message that lacks attribute 46 in FIG. 4). In this scenario in which the newly indicated VLAN information propagation (disabled) state (e.g., caused by the lack of attribute 46) is inconsistent with the existing VLAN information propagation (enabled) state of trunk interface 28-1, authenticator device 10-1 (e.g., processing circuitry 20-1) may not authenticate or authorize the new supplicant network device 10-2 for network access through shared interface 28-1 because of the inconsistency.

In general, as demonstrated by the examples of FIGS. 6 and 7, the first-connected (e.g., first-authenticated) network device for a particular trunk interface may control the VLAN information propagation configuration state of the trunk interface. As such, a supplicant device newly coupled (e.g., communicatively coupled) to the same trunk interface may be authenticated for network access through the same shared trunk interface if the new supplicant device is compatible with the existing VLAN information propagation configuration state of the trunk interface (e.g., receives an access accept message indicative of a VLAN information propagation configuration state that is compatible with the existing VLAN information propagation configuration state of the trunk interface).

Figure 8:
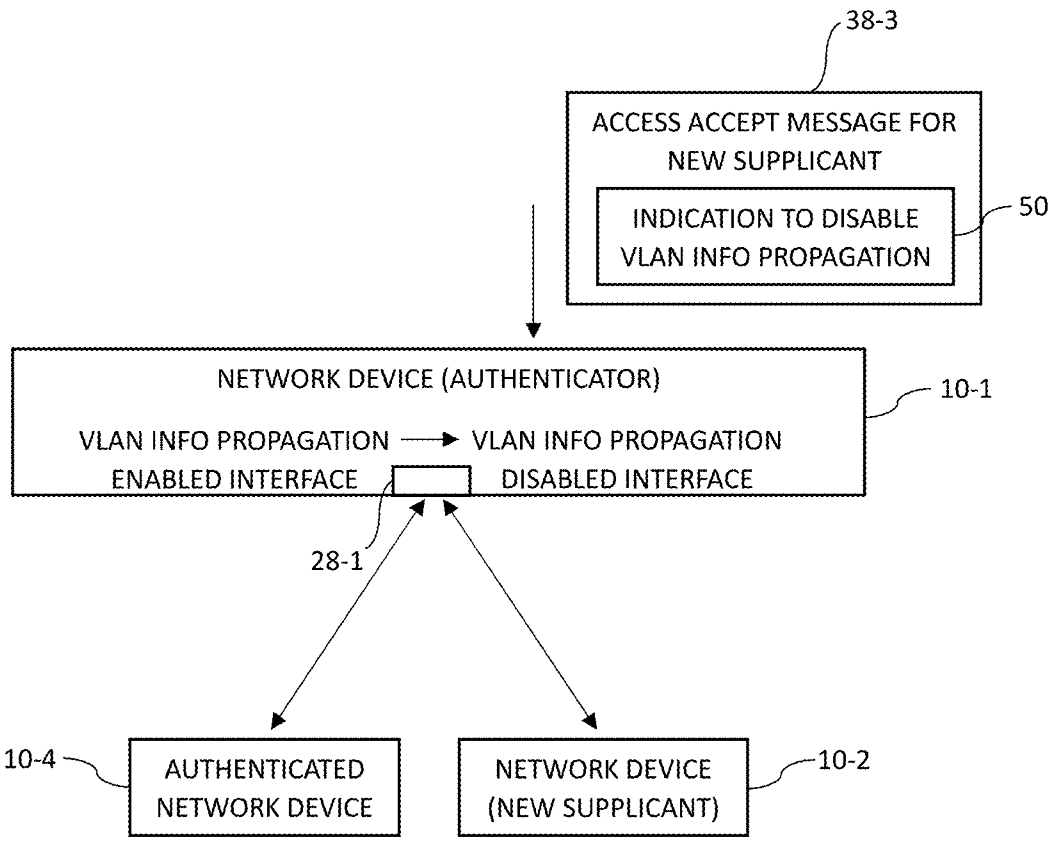
FIG. 8 is a diagram of an illustrative network device configured to process an indication to disable VLAN information propagation in accordance with some embodiments.

In some instances, a message containing an indication to disable VLAN information propagation configuration (e.g., message 38 containing indication 50 in FIG. 4) may be used to override the existing (enabled) interface state for VLAN information propagation. As shown in the example of FIG. 8, network device 10-1 may have trunk interface 28-1 that is initially enabled for VLAN information propagation, e.g., resulting from the authentication process of an existing authenticated device 10-4 (e.g., receiving an access accept message containing an indication to enable VLAN information propagation when device 10-4 has been authenticated).

Still referring to FIG. 8, when new supplicant device 10-2 is communicatively coupled to interface 28-1 to which device 10-4 is already communicatively coupled (e.g., both through an intervening network device such as a bridge), the operations described in connection with FIG. 3 may take place to authenticate device 10-2 for network access. In this example of FIG. 8, device 10-1 (e.g., processing circuitry 20-1) may receive an access accept message 38-3 for authenticating device 10-2. Message 38-3 may contain indication 50 to disable VLAN information propagation. In this scenario in which the newly indicated VLAN information propagation configuration state is explicitly a disabled state, (e.g., message 38-3 contains indication 50, instead of lacking attribute 46 as in the example of FIG. 7), authenticator device 10-1 (e.g., processing circuitry 20-1) may update the existing VLAN information propagation (enabled) state of interface 28-1 to a VLAN information propagation disabled state.

Accordingly, the existing device 10-4 may no longer be able to have its (host) VLAN information propagated using the trunk interface as originally configured (e.g., protocol data units for the VLAN information propagation protocol containing VLAN information received by interface 28-1 from device 10-4 may no longer be processed by processing circuitry 20-1 of device 10-1). As such, after the current authenticated network access session for device 10-4 expires, a subsequent request from network device 10-4 for network access using interface 28-1 may be denied or may not be authorized (e.g., in a manner analogous to the example of FIG. 6, but with the roles of devices 10-4 and 10-2 reversed).

Figure 9A:
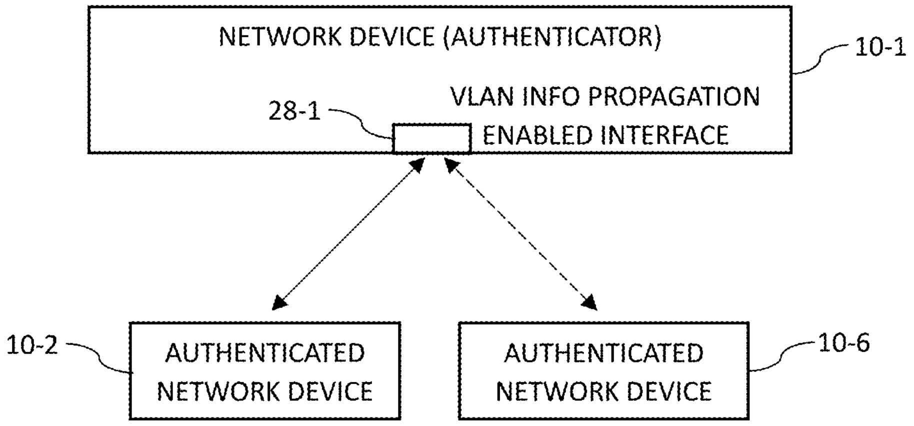
FIGS. 9A and 9B are diagrams of illustrative scenarios in which an authenticated device is decoupled from an interface in accordance with some embodiments.
Figure 9B:
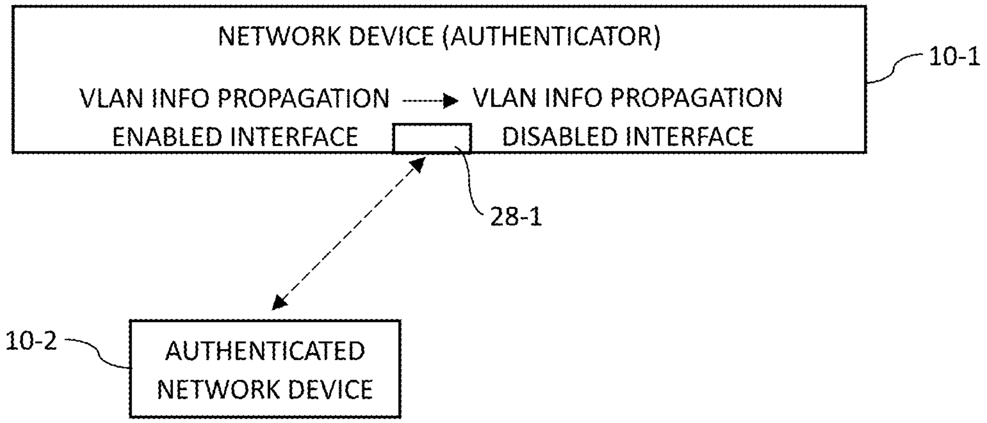

FIGS. 9A and 9B are diagrams of an illustrative authenticator device configured to handle authenticated network devices being communicatively decoupled (e.g., disconnected) from a trunk interface in different scenarios.

In the example of FIG. 9A, authenticator device 10-1 may have a trunk interface 28-1 that is shared between and communicatively coupled to both first authenticated device 10-2 and second authenticated device 10-6. Trunk interface 28-1 may be configured to exhibit a VLAN information propagation enabled state for propagating VLAN information while both devices 10-2 and 10-6 are communicative coupled to interface 28-1 (e.g., with one or more intervening network devices). In one illustrative scenario, interface 28-1 may be in the enabled state because network device 10-1 (e.g., processing circuitry 20-1) first received a message for authenticating device 10-2 containing an indication (e.g., indication 48 in FIG. 4) to enable VLAN information propagation and subsequently received another message for authenticating device 10-6 also containing an indication (e.g., indication 48 in FIG. 4) to enable VLAN information propagation. Based on the interface states indicated by the two messages being the same and therefore consistent, network device 10-1 (e.g., processing circuitry 20-1) may provide network access through VLAN information propagation enabled interface 28-1 to both devices 10-2 and 10-6.

Still referring to FIG. 9A, but at a later time and as a continuation to the example above, a given one of the authenticated network devices such as device 10-6 may be communicatively decoupled (e.g., disconnected) from interface 28-1. Based on device 10-6 being decoupled from interface 28-1, network device 10-1 (e.g., processing circuitry 20-1) may determine that one or more authenticated network devices (e.g., network device 10-2) remains communicatively coupled (e.g., connected) to interface 28-1. Based on the one or more remaining authenticated network devices being authenticated in a manner that indicates that interface 28-1 should have a VLAN information propagation enabled state, network devices 10-1 (e.g., processing circuitry 20-1) may maintain the enabled state of interface 28-1 (e.g., keep the enabled state of interface 28-1 unchanged) even after network device 10-6 has been decoupled.

In the example of FIG. 9B (e.g., which may be a network configuration after the operations described in connection with FIG. 9A have occurred), authenticator network device 10-1 may have a trunk interface 28-1 having a VLAN information propagation enabled state. In this example, a single (last remaining) authenticated network device may be communicatively coupled to interface 28-1 (e.g., after network device 10-6 in FIG. 9A has been decoupled and only device 10-2 remains coupled).

Still referring to FIG. 9B, but at a later time and as a continuation to the example above, a last authenticated device 10-2 may be communicatively decoupled from interface 28-1. Based on device 10-2 being decoupled from interface 28-1, network device 10-1 (e.g., processing circuitry 20-1) may determine that no authenticated network devices remain communicatively coupled to interface 28-1. Accordingly, based on this determination, network device 10-1 (e.g., processing circuitry 20-1) may update the VLAN information propagation state of interface 28-1 from an enabled state to a disabled state. By having interface 28-1 exhibit a VLAN information propagation disabled state in this scenario, device security can be enhanced by preventing future connections to interface 28-1 from automatically having access to an interface with VLAN information propagation enabled, and possible issues caused by residual interface states can be mitigated.

Figure 10:
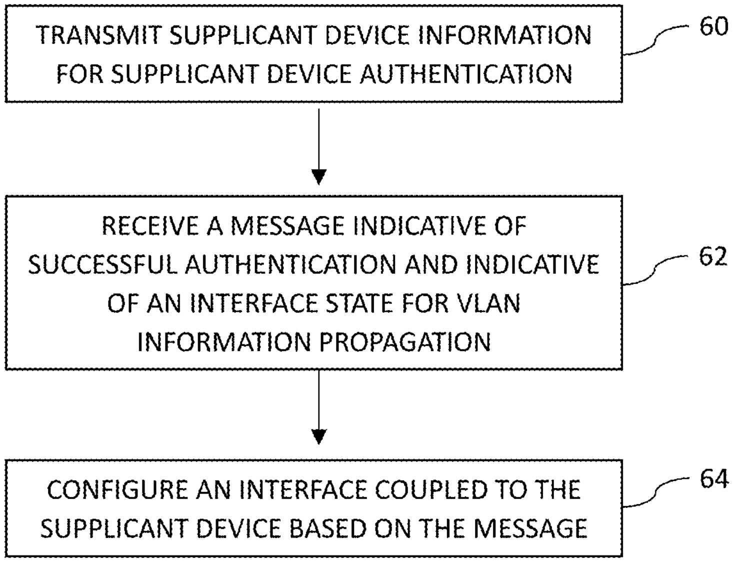
FIG. 10 is a flowchart of illustrative operations for dynamically configuring a device interface based on VLAN information propagation configuration information in accordance with some embodiments.

FIG. 10 is a flowchart of illustrative operations for dynamically configuring a device interface to participate (or not participate) in VLAN information propagation (e.g., using a VLAN information propagation protocol). In particular, these operations may be performed by processing circuitry 20 of a network device 10 (e.g., processing circuitry 20-1 of network device 10-1) using other components of network device 10 (e.g., memory circuitry 22, processing circuitry 24, and/or interfaces 28 of device 10-1). In configurations described herein as an illustrative example, the operations described in connection with FIG. 10 may be performed by processing circuitry 20 executing software instructions stored on memory circuitry 22. If desired, one or more operations described in connection with FIG. 10 may be performed by other (dedicated) hardware components in network device 10. If desired, processing circuitry and memory circuitry of other types of devices may similarly be configured to perform the operations described in connection with FIG. 10.

At block 62, processing circuitry of an authenticator device may transmit supplicant information for supplicant authentication (e.g., authenticating a supplicant device for network access). As one illustrative example described in connection with FIG. 3, processing circuitry of an authenticator device such as network device 10-1 may convey device information 34 in an access request message 36 to authenticator server 14. This example is merely illustrative. If desired, the processing circuitry for any desired type of authenticator device may convey information to facilitate authentication of any type of supplicant device using an authentication system.

At block 64, the processing circuitry may receive a message indicative of successful authentication (e.g., indicative of the supplicant device being allowed network access). The message may also be indicative of an interface state for VLAN information propagation. As examples described in connection with FIGS. 4-8, the message may include a VLAN information propagation configuration attribute for the supplicant device that can indicate VLAN information propagation being enabled for the supplicant device or disabled for the supplicant device, or may lack the VLAN information propagation configuration attribute. While configurations in which an access accept message is used to indicate the desired interface state for VLAN information propagation, this is merely illustrative. If desired, other messages from the authenticator server and/or from other external sources may be used to indicate an interface state for VLAN information propagation.

At block 66, the processing circuitry may configure an interface of the authenticator device coupled to the supplicant device based on the message. As described in connection with the examples and scenarios in connection with FIGS. 5-8, the authenticator device may identify the interface (coupled to the supplicant device) for which the indication of VLAN information propagation for the supplicant device is applicable, may simply configure the interface to exhibit an enabled or disabled state directly indicated in the received message, may configure the interface to exhibit an enabled or disabled state based on whether or not existing authenticated network devices are coupled to the same interface, may configure the interface to exhibit an enabled or disabled state based on the existing interface state, and/or may configure the interface to exhibit an enabled or disabled state based on other criteria. In some instances, the resulting interface state may differ from that indicated by the VLAN information propagation for the supplicant device in the received message.

The methods and operations described above in connection with FIGS. 1-10 may be performed by the components of network device(s) and/or server(s) or other host equipment using software, firmware, and/or hardware (e.g., dedicated circuitry or hardware). Software code for performing these operations may be stored on non-transitory computer-readable storage media (e.g., tangible computer-readable storage media) stored on one or more of the components of the network device(s) and/or server(s) or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry of the network device(s) and/or server(s) or other host equipment (e.g., compute devices 16 of server 14 in FIG. 1, processing circuitry 20 of network device 10 in FIG. 2 such as processing circuitry 20-1 of network device 10-1, etc.).

The foregoing is merely illustrative and various modifications can be made to the described embodiments. The foregoing embodiments may be implemented individually or in any combination.

What is claimed is:

1. A network device comprising:
an input-output interface;
memory circuitry; and
processing circuitry coupled to the memory circuitry and configured to:
perform an authentication operation for providing network access to a supplicant device coupled to the input-output interface;
receive a message as part of the authentication operation; and
configure the input-output interface to exhibit a Virtual Local Area Network (VLAN) information propagation state based on the received message, wherein the VLAN information propagation state is indicative of whether to propagate VLAN information received at the input-output interface to one or more additional network devices.

2. The network device defined in claim 1, wherein the message includes an indication to enable VLAN information propagation for the supplicant device and wherein the exhibited VLAN information propagation state is a VLAN information propagation enabled state.

3. The network device defined in claim 2, wherein the exhibited VLAN information propagation state being the VLAN information propagation enabled state is indicative of the input-output interface participating in a VLAN information propagation protocol at least in part by propagating the VLAN information received at the input-output interface to the one or more additional network devices.

4. The network device defined in claim 2, wherein the message is an access accept message from an authentication server indicative of successful authentication of the supplicant device for network access.

5. The network device defined in claim 4, wherein the indication is specified using a vendor-specific attribute in the access accept message.

6. The network device defined in claim 1, wherein the message includes an indication to disable VLAN information propagation for the supplicant device and wherein the exhibited VLAN information propagation state is a VLAN information propagation disabled state.

7. The network device defined in claim 6, wherein the exhibited VLAN information propagation state being the VLAN information propagation disabled state is indicative of the input-output interface not participating in a VLAN information propagation protocol at least in part by not propagating the VLAN information received at the input-output interface to the one or more additional network devices.

8. The network device defined in claim 6, wherein the processing circuitry is configured to configure the input-output interface to exhibit the VLAN information propagation state by updating the VLAN information propagation state from a VLAN information propagation state enabled state to the VLAN information propagation disabled state while an authenticated device is coupled to the input-output interface.

9. The network device defined in claim 1, wherein the processing circuitry is configured to:

determine, after the supplicant device is communicatively decoupled from the input-output interface, that an authenticated network device remains communicatively coupled to the input-output interface; and maintain the exhibited VLAN information propagation state for the input-output interface based on the determination.

10. The network device defined in claim 1, wherein the processing circuitry is configured to:

determine, after the supplicant device is communicatively decoupled from the input-output interface, that no authenticated network device remains communicatively coupled to the input-output interface; and update the exhibited VLAN information propagation state for the input-output interface from a VLAN information propagation enabled state to a VLAN information propagation disabled state based on the determination.

11. The network device defined in claim 1, wherein the processing circuitry is configured to:

perform an additional authentication operation for providing network access to an additional supplicant device coupled to the input-output interface;

receive an additional message as part of the additional authentication operation, wherein the additional message is indicative of an additional VLAN information propagation state different than the exhibited VLAN information propagation state; and deny network access to the additional supplicant device.

12. A network device comprising:

a plurality of input-output interfaces;

memory circuitry; and processing circuitry coupled to the memory circuitry and configured to:

authenticate an additional network device for network access;

obtain an indication to enable Virtual Local Area Network (VLAN) information propagation for the additional network device;

identify a given input-output interface in the plurality of input-output interfaces that is communicatively coupled to the additional network device; and configure the identified input-output interface to participate in a VLAN information propagation protocol based on the obtained indication.

13. The network device defined in claim 12, wherein the processing circuitry is configured to receive a protocol data unit for the VLAN information propagation protocol from the additional network device at the participating input-output interface, wherein the protocol data unit contains an identifier of a VLAN to which a host communicatively coupled to the additional network device belongs, and wherein the processing circuitry is configured to transmit the identifier of the VLAN to a third network device having an additional input-output interface that participates in the VLAN information propagation protocol.

14. The network device defined in claim 12, wherein the processing circuitry is configured to authenticate the additional network device for network access by communicating with an authentication system and wherein the indication is obtained from the authentication system.

15. The network device defined in claim 12, wherein the additional network device is a wireless access point.

16. The network device defined in claim 1, wherein the VLAN information is in a protocol data unit in accordance with a VLAN information propagation protocol and wherein the protocol data unit is received at the input-output interface.

17. The network device defined in claim 16, wherein the VLAN information propagation protocol is a Multiple VLAN Registration Protocol.

18. A method of operating an authentication server, the method comprising:

receiving, by the authentication server and from an authenticator network device, an access request message for authenticating a supplicant network device for network access;

transmitting, by the authentication server and to the authenticator network device, an access accept message indicative of successful authentication of the supplicant network device for network access, wherein the access accept message includes an indication of Virtual Local Area Network (VLAN) information propagation being enabled or disabled for the supplicant network device.

19. The method defined in claim 18, wherein the authentication server is a Remote Authentication Dial-In User Service (RADIUS) server and wherein the indication is provided in a vendor-specific attribute in the access accept message.

20. The method defined in claim 18, wherein the indication is an indication that VLAN information propagation is enabled for the supplicant network device and wherein the indication that VLAN information propagation is enabled for the supplicant network device causes the authenticator network device to propagate VLAN information received at an interface, of the authenticator network device, coupled to the supplicant network device.

* * * * *